July 7, 1970   R. J. COLLIER ET AL   3,519,323
HOLOGRAM METHOD AND APPARATUS FOR RECORDING
AND RECONSTRUCTING MULTICOLOR IMAGES
Filed Aug. 30, 1966                            2 Sheets-Sheet 1
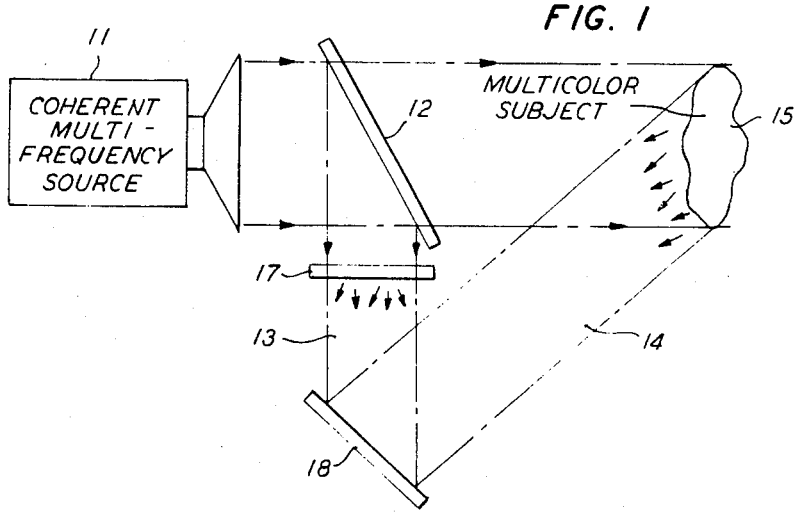
FIG. 1
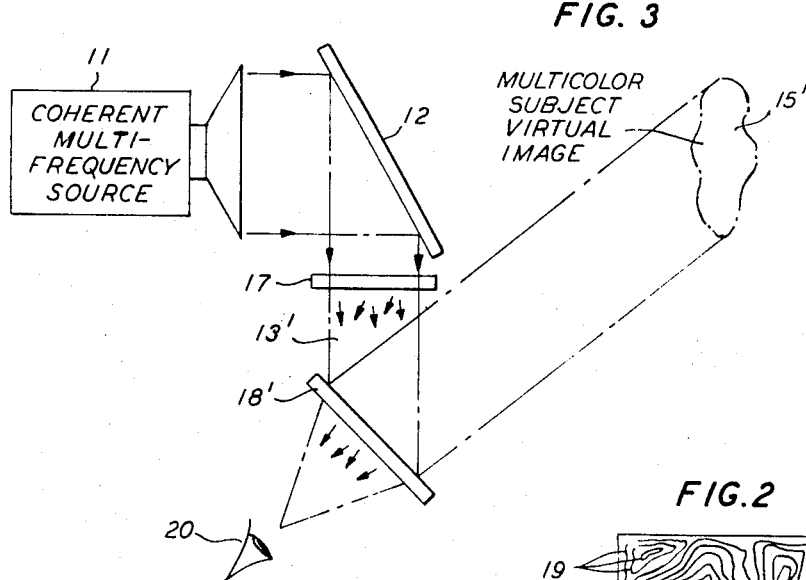
FIG. 3
FIG. 2
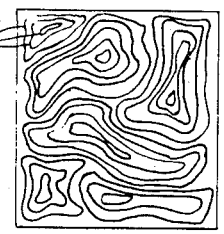
FIG. 4
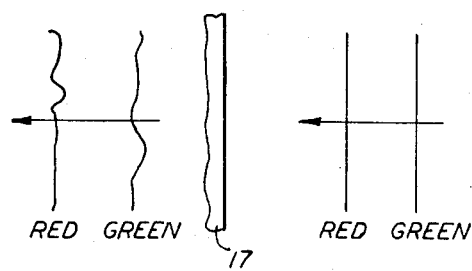
INVENTORS  R. J. COLLIER
           K. S. PENNINGTON
BY
ATTORNEY

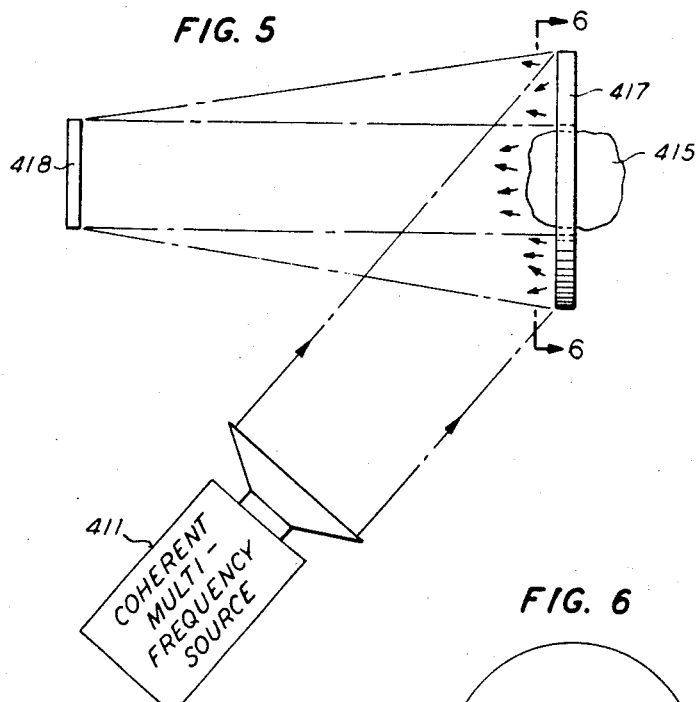
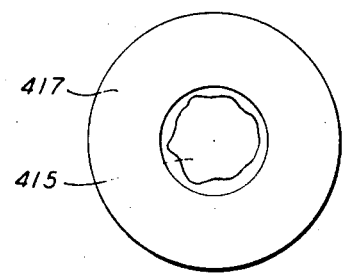
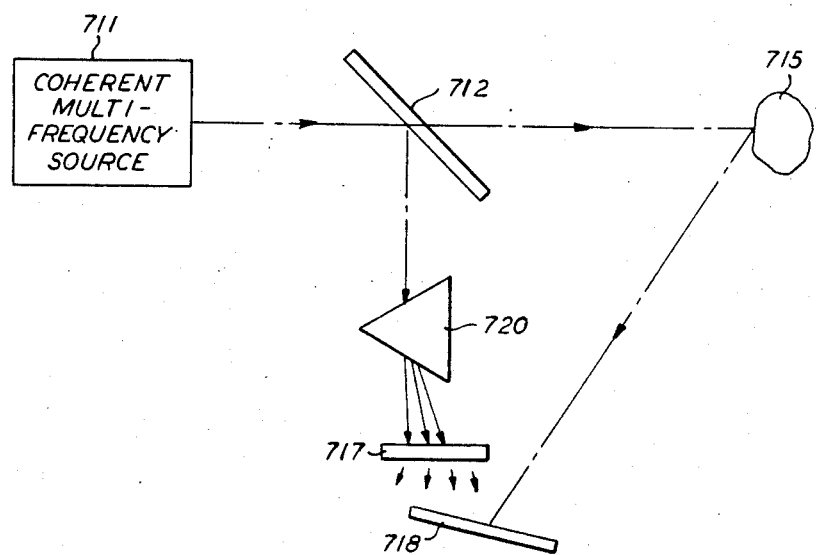

United States Patent Office 3,519,323
Patented July 7, 1970

3,519,323
HOLOGRAM METHOD AND APPARATUS FOR RECORDING AND RECONSTRUCTING MULTICOLOR IMAGES
Robert J. Collier, New Providence, and Keith S. Pennington, Basking Ridge, N.J., assignors to Bell Telephone Laboratories, Incorporated, Murray Hill and Berkeley Heights, N.J., a corporation of New York
Filed Aug. 30, 1966, Ser. No. 576,105
Int. Cl. G02b 27/00
U.S. Cl. 350—3.5                                    9 Claims

ABSTRACT OF THE DISCLOSURE

Cross-talk in the reconstruction of multicolor images from holograms is reduced or eliminated by projecting the multifrequency reference beam through a diffusing screen during image recording, and by projecting the reconstructing beam through the identical diffusing screen during the reconstruction step.

---

This relates to holographic methods and apparatus for making multicolor holograms and for reducing cross-talk incident to reconstruction of images from such holograms.

A hologram is a photographic recording of light wave interference patterns that result from simultaneous impingement on a photographic medium of a reference light beam and light from a subject being recorded. After the photographic medium has been developed, the recorded interference patterns constitute a complex diffraction grating which is capable of constructively diffracting properly directed illuminating light to reconstruct an image of the recorded subject. If a multicolor hologram is to be made, multifrequency subject and reference beams are used for forming superimposed diffraction gratings representative of each of the colors to be recorded.

If a multicolor hologram is made by conventional techniques on an optically thin photographic medium, the reconstructed image is often distorted due to cross-talk resulting from spurious diffraction of light of one color by the interference diffraction gratings representative of other colors. For example, the red reconstructing light may be diffracted to a substantial extent by the recorded green light interference pattern to give a spurious red image that is displaced from the desired red image. The paper "Multicolor Wavefront Reconstruction," by K. S. Pennington and L. H. Lin, Applied Physics Letters, vol. 7, No. 3, Aug. 1, 1965, page 56, points out that cross-talk can be reduced or eliminated by using an optically thick photographic medium and a sufficiently wide angle between the interfering subject and reference beams. Exposure and development of the photographic medium then forms three-dimensional interference diffraction gratings (i.e., gratings having appreciable thickness dimensions) which, if properly formed, reduce the spurious diffraction responsible for cross-talk. This technique has practical limitations because optically thick photographic emulsions are difficult to make and use.

Moreover, it has become increasingly clear that the requirement of three-dimensional interference patterns limits the use to which multicolor holograms can be put. For example, reproducing copies of three-dimensional holograms is much more complicated than reproducing two-dimensional holograms. At least in theory, a two-dimensional hologram can be scanned by an electron beam to transmit the information of the hologram in accordance with television transmission principles, but there is no known way to electronically scan and transmit three-dimensional hologram information.

Accordingly, it is an object of this invention to reduce or eliminate reconstruction cross-talk in multicolor holograms that are defined by two-dimensional as well as three-dimensional recorded interference patterns.

This and other objects of the invention are attained in an illustrative embodiment thereof comprising a source of coherent multifrequency light from which a subject light beam and a reference light beam are derived. The subject beam containing an image to be recorded, is directed toward a photographic plate. The reference beam is projected through a suitable coding or wavefront distorting medium and then to the photographic plate at an angle with respect to the subject beam. The coded reference beam light interferes with the subject beam light to form interference patterns on the photographic plate which, when developed, constitute a hologram recording of the subject.

An image of the subject is reconstructed by projecting the same reference beam through the same coding medium to the developed hologram which has been replaced in the same position relative to the reference beam that it occupied during its formation. As will be explained more fully later, the use of a coding medium in the reference beam path during both recording and reconstruction insures independent reconstruction of the various recorded colors and reduces or eliminates the cross-talk described above. Hence, the photographic emulsion upon which the recording is made may be optically thin; there is no need for the formation of three-dimensional interference patterns.

In accordance with another embodiment of the invention, the coded reference beam is formed into an annulus that surrounds the subject beam path. This provision insures that, during reconstruction, scattered light or "noise" is substantially uniformly distributed, rather than being separated according to color to form a rainbow effect superimposed on the reconstructed image.

In accordance with still another embodiment, the reference beam light is separated into single-frequency beams which are each directed through separate coding media having different wavefront distorting characteristics. This provision further reduces the likelihood of cross-talk and is especially advantageous when there are only small differences of frequency among the various reference beam optical frequency components. For certain choices of coding media, projecting the separate single-frequency beams through different portions of the same medium accomplishes this same purpose.

These and other objects, features and advantages of our invention will be better understood from a consideration of the following detailed description, taken in conjunction with the accompanying drawing in which:

FIG. 1 is a schematic illustration of apparatus for making a hologram recording of a subject in accordance with an illustrative embodiment of the invention;

FIG. 2 is a schematic illustration of a hologram;

FIG. 3 is a schematic illustration of apparatus for reconstructing a stored image that has been recorded by the apparatus of FIG. 1;

FIG. 4 is a schematic illustration of various wavefront configurations in the apparatus of FIG. 1;

FIG. 5 is a schematic illustration of another embodiment of the invention;

FIG. 6 is a view taken along lines 6—6 of FIG. 5; and

FIG. 7 is a schematic illustration of another embodiment of the invention.

Referring now to FIG. 1 there is shown a source of light energy 11 for forming and projecting a light beam having a plurality of coherent optical frequency components. The light beam is divided by a beam splitter 12 into a reference beam 13 and a subject beam 14 which is reflected from a multicolor subject 15 to be recorded. Typically the source comprises a plurality of lasers each providing coherent light of its own characteristic wavelength. The reference beam 13 is projected through a coding medium, the specific embodiment being in this case a diffusing screen 17 which diffuses the reference beam in a random and arbitrary manner as indicated by the small arrows. The subject beam 14 and reference beam 13 impinge at different angles on a common surface of a photographic plate 18 to form interference patterns which, after conventional developing, constitute a hologram recording of the subject 15. As is known in the art, subject and reference beams must ordinarily be derived from a common coherent light source so that they will be phase-related; their interference then effectively records the relative phase and frequency of the subject beam light components.

A multicolor hologram is essentially a superimposition of a number of single color hologram recordings. For example, if the source 11 provides coherent green and red light, the green light of reference beam 13 interferes with the green light of subject beam 14 to record the wavefronts from subject 15 as contained in the green light component of subject beam 14. Likewise, the red light component of reference beam 13 interferes with the red light component of subject beam 14 to form a superimposed pattern containing the red light information. A typical hologram, including interference fringes 19 which form a complex pattern, is shown in FIG. 2. The interference fringe patterns do not bear any resemblance to the stored image, but nevertheless, the image will be reconstructed from the hologram if it is properly illuminated.

As shown in FIG. 3, a virtual image 15' of the subject 15 is reconstructed by directing multifrequency light of source 11 through the diffusing screen 17 so that the developed hologram 18' is illuminated by the identical reference beam light that was used during the recording process. Upon reconstruction, the interference patterns on the hologram 18' diffract the reference beam light as shown; an observer 20 looking at the diffracted reference beam light will then observe a reconstructed image 15' having the same apparent relative location as the original subject 15 of FIG. 1. The colors of the original subject 15 will be reproduced to the extent that the multifrequency source 11 contains the proper ratios of those colors required by color theory. For example, all colors on the original multicolor subject can be reconstructed if the multifrequncy source 11 projects the proper proportions of red, green, and blue light.

An advantage of our hologram system over prior multicolor hologram systems is that cross-talk between the reproduced colors is substantially reduced or eliminated both in the case of two-dimensional recordings and in the case of three-dimensional recordings. If a multicolor hologram recording is made on a two-dimensional photographic medium by conventional hologram techniques without the diffusing screen 17 in the reference beam path, the reconstructed virtual image 15' will, in the most general case, not be a faithful reproduction of the subject 15. The problem with conventional multicolor holograms is that upon reconstruction, the reference beam light of one color is diffracted by diffraction gratings on the hologram formed by different colors. For example, the red light component of the reference beam 13' will be diffracted by the green light diffraction pattern to reproduce a spurious red color virtual image of the subject. This spurious or "ghost" image will usually be displaced from the red colored image that is properly reconstructed by diffraction of the red light by the red color diffraction pattern and may therefore seriously distort the observed image.

This problem can be avoided to some extent by recording the interference patterns in three dimensions as described in the Pennington and Lin publication; that is, by using an appropriately thick photographic emulsion and by using large angles between the subject and reference beams so that the illuminating beam interacts with many diffraction planes in its passage through the hologram. However, a hree-dimensional hologram recorded in conventional Kodak 649F emulsion, even with the largest angles between reference and subject beam, does not completely suppress suprious image formation due to insufficient thickness of the emulsion. Application of our coded reference beam technique to three-dimential recording eliminates spurious images.

In accordance with our technique, cross-talk is substantially eliminated because the diffusing screen 17, during both recording and reconstruction, effectively codes the different frequency components of the reference beam so that they cannot be diffracted by other color interference patterns to form displaced images. It can be shown that a conventional duffusing medium will diffuse different optical frequencies in different ways. For example, red light projected through the diffusing screen 17 will be consistently diffused in one characteristic manner, while green light projected through the same diffusing screen will consistently be diffused in a different manner. Because the diffusion characteristics of the diffusing screen vary with optical frequency, and because the dispersion of the reference wave as it travels between diffuser and photographic plate varies with optical frequency, reference beam light of each frequency can be diffracted so as to reconstruct the subject wavefronts only by interference pattern recordings representative of that same color.

Differences of diffusion characteristics with respect to frequency are illustrated schematically in FIG. 4 in which parallel wavefronts of red and green reference beam light are directed toward the diffusing screen 17. The reference wavefronts are each distorted by the screen in a characteristic manner so that they emanate from the screen with different configurations or distortions. These relative distortions become compounded as the wavefront travels from the diffusing screen. As a result, the two reference beam frequencies, upon arrival at the photosensitive medium, are spatially modulated with unique codes and each produce unique characteristic interference patterns with the subject beam. The two frequencies are distinctly coded by the diffusing screen because the varying thickness of the screen represents a multitude of different optical path lengths whose values differ for each frequency, thus resulting in a complex distribution of amplitude and phase over the exit plane of the diffusing screen. This exit plane according to Huygen's theory can be regarded as composed of a large number of secondary light sources having amplitudes and relative phases pseudo-randomly distributed. The disperson or defocusing of the light from these sources in traveling the distance in air between diffuser and emulsion will, according to the Fresnel-Kirchoff law, depend on the frequency, and the light distributed over the emulsion will, as a result, have a distinct character for each frequency.

Image reconstruction results from complex diffraction of the reference beam by the hologen such that the amplitude and phase distribution of the original subject wavefronts are reproduced. Since the distorted red wavefront of FIG. 4 was used in recording the red diffraction grating, only the same distorted wavefront will be constructively diffracted by the red grating to reconstruct the image. The green light wavefront, on the other hand, is garbled with respect to the red grating and will therefore be diffused and scattered by the red grating. Likewise, the red light will not be constructively diffracted to reconstruct a recognizable image by the green grating. The red image made by interaction of the red light with the red grating will be correctly registered with the green image made by interaction of green light with the green graing and there will be no cross-talk resulting from spurious images that are displaced from the multicolor reconstructed image. The red and green components that are scattered by the hologram constitute a "noise" background for the reconstructed image. For proper interaction of the reconstructing light with the hologram, the hologram should be positioned so that the angle of impingement of the diffused reconstructing beam 13' is the same as the angle of impingement of the recording beam 13 on the photographic plate 18; in other words, the relative location of the hologram with respect to the reconstructing beam should be the same as that of the photographic medium with respect too the recording beam.

Independent reconstruction of the various colors and the elimination of cross-talk do not depend on the formation of three-dimensional diffraction gratings as described above; neither do they depend on a sufficiently large angular separation of subject and reference beams during recording. This obviously gives greater flexibility in the choice of photographic media. For example, more direct angles of the recording beams permit the use of lower resolution high speed photographic films. An optically thin photographic emulsion can be used; i.e., an emulsion that is so thin that its thickness has no substantial effect on its optical properties. Further, as mentioned above, such developed holograms are more amenable to the reproduction of copies because they are only two-dimensional. Our invention will also allow reconstruction through white light illumination, that is, illumination with reference beam light that contains many frequencies in addition to those used during recording. The additional frequency components will be scattered by the hologram rather than being formed into displaced spurious images. Our invention will improve the suppression of spurious images reconstructed from holograms recorded in thick media and also improve for this reason white light reconstructions from such holograms.

In an experimental version of the apparatus shown, the multifrequency source 11 comprised an argon laser for generating coherent light at 5145 angstroms and 4480 angstroms which was then mixed by a beam splitter with light from a helium-neon laser that generated light at 6328 angstroms. The diffusing screen 17 was a conventional sandblasted glass plate. The photographic medium 18 was Kodak 649F film having an emulsion approximately 15 microns thick. The angle between the subject and reference beams during recording was approximately 10 degrees.

While the hologram diffraction pattern of each color scatters the reconstructing light of other colors, there is sometimes a tendency to disperse the colors according to frequency. For example, in a three-color apparatus, the green hologram diffraction grating may scatter red light predominantly in one direction and blue light in another direction. The observer may then see the reconstructed image 15' superimposed on a sort of "rainbow" background, which for some purposes could be distracting.

This effect can be reduced or eliminated by the apparatus of FIG. 5 in which coherent multifrequency light from a source 411 is directed against a subject 415 and an annular reflecting diffusing screen 417. The light reflected from screen 417 constitutes a diffused reference beam that interacts with light reflected from subject 415 to form interference patterns in a photographic plate 418. After the plate is developed a virtual image is reconstructed by illuminating the developed hologram, which has been replaced in the position it occupied during formation, with light reflected from the diffusing screen 417.

As before, the virtual image appears to be at the same location as the original subject 415. Because the incoming reconstructing reference beam completely surrounds the reconstructed image, however, the background noise colors are more uniformly diffused over the entire image. For example, if the red diffraction grating scatters green light emanating from the extreme upper edge of diffusing screen 417 toward the lower edge of the reconstructed image, then it will also scatter green light emanating from the lower edge of the diffusing screen toward the upper edge of the image. As a result, during reconstruction, the various noise colors will be more uniformly diffused throughout the image background.

The extent to which the invention, as described thus far, prevents cross-talk depends on the extent to which the wavefront distorting characteristics of the coding medium change with frequency. While the distorting characteristics of any conventional diffusing screen or diffusing reflector must inherently be different for different frequencies, such differences may not be sufficiently pronounced to eliminate all noticeable cross-talk if the frequency differences of the reference beam components are relatively small. This may be especially true if ten or twelve different colors are used in the subject and reference beams.

The embodiment of FIG. 7 illustrates one technique for insuring different diffusion characteristics and therefore different coding for the different reference beam frequency components. As in the embodiment of FIG. 1, a hologram recording of a subject 715 is made by exposing a photographic plate 718 to subject beam light reflected from a subject 715 and diffused reference beam light that is phase-related with the subject beam. Prior to diffusion, however, the reference beam is directed through a prism 720 that separates the reference beam into its various frequency components.

Each of the separate single-frequency reference beam components is then projected through a different section of the diffusing screen 717. Since conventional diffusing screens are made to have random transmissibility and diffusing characteristics, projection of each light component through a different portion of the diffusing screen is the equivalent of projection through entirely different diffusing media. Hence, each different light frequency component is spatially modulated or coded in a unique manner, and the different coding of the components does not depend on changes of diffusing screen characteristics as a function of frequency. After exposure, the plate 718 is developed for forming a hologram recording of subject 715.

As before, the image of subject 715 is reconstructed by illuminating the developed hologram, which has been replaced in the same position relative to the reference light that it occupied during its formation, only with the coded reference beam light. Prior to diffusion, the reference beam is separated according to frequency by prism 720 so that each component is projected through the same diffusing screen portion as during recording. For the reasons given before, each frequency component is capable of interaction only with the corresponding frequency grating pattern of the hologram and will not be constructively diffracted by the other frequency gratings.

From the foregoing, it should be appreciated that the inventive concept relies on differential spatial modulation of the different reference beam frequency components; each frequency component is thereby uniquely coded. Reconstruction requires reproducibility of this coding or spatial modulation. Hence, the diffusing screen or the diffusing reflector are intended to be only two examples of numerous encoders that could be used. For example, an optical fiber bundle containing light transmitting fibers of varying length could be used to give different spatial modulation to the different optical frequencies. Likewise, a screen containing numerous apertures of various size, or patterned plastic plate could be used.

The reflection of the subject beam by the multicolor subject 15 should be considered as being only one illustrative way of spatially intensity modulating the subject beam. Likewise, the visual observation depicted in FIG. 3 is intended only to be illustrative of one way of detecting the recorded subject beam modulation. Various other devices for modulating the subject beam and detecting the stored information of the developed hologram may be

What is claimed is:

1. A method of recording and reconstructing images comprising the steps of:
   projecting a multifrequency subject light beam, containing an image of a multicolor subject to be recorded, against a photographic medium;
   forming and projecting a multifrequency recording reference beam each of whose frequency components are coherently phase-related to the corresponding frequency components in the subject beam;
   simultaneously modulating in a different characteristic manner the shape of the wavefronts of the different frequency components of the reference beam to the extent necessary to reduce cross-talk between the different frequency components, whereby a coded reference beam is formed;
   directing the coded recording reference beam onto the photographic medium for interference with the subject beam, thereby to record the subject beam image;
   forming from the photographic medium a hologram;
   forming a coded multifrequency reconstructing reference beam which includes coded optical frequency components that are substantially identical to those contained in the aforementioned coded recording reference beam and projecting it against the hologram at substantially the same relative angle as the angle of the recording reference beam with respect to the photographic medium, thereby to reconstruct the recorded multicolor image while substantially reducing or eliminating cross-talk.

2. The method of claim 1 wherein:
   the coded recording reference beam is projected toward the photographic medium from a region that surrounds the subject beam, whereby reconstruction by the reconstructing reference beam substantially uniformly scatters noise light.

3. The method of claim 1 wherein:
   the step of modulating the recording reference beam comprises the steps of separating the reference beam frequency components into discrete single-frequency beams and independently modulating each single-frequency beam by coding media having different wavefront distorting characteristics.

4. The method of claim 1 wherein:
   the reconstructing reference beam contains many frequencies in addition to those contained in the recording reference beam.

5. Apparatus for recording and reconstructing images comprising:
   means for forming and projecting a multifrequency subject light beam wherein each frequency component is separately substantially coherent;
   means for forming and projecting a reference light beam that contains the same optical frequencies as the subject beam each of which frequency components are coherently phase-related to the corresponding frequency components in the subject beam;
   means for modulating the subject beam to impress a multicolor image thereon;
   means for directing the subject beam to a photographic medium;
   means for simultaneously modulating in a different characteristic manner the shape of the wavefronts of the different frequency components of the reference beam to the extent necessary to reduce cross-talk between the different frequency components, whereby a coded reference beam is formed;
   means for projecting the coded reference beam at an angle of impingement to the photographic medium that is different from the angle of impingement to the photographic medium by the subject beam, whereby simultaneous impingement of subject and reference beams forms interference patterns in the photographic medium;
   means for projecting the coded reference beam to the photographic medium independently of the subject beam for reconstruction of recorded multicolor images on the photographic medium.

6. The apparatus of claim 5 wherein:
   the photographic medium is thin relative to the wavelength of visible light.

7. The apparatus of claim 5 wherein:
   the means for modulating the different frequency components in a characteristic manner comprises means for separating the different frequency components and projecting each of them against coding media having different wavefront distorting characteristics for each component.

8. The apparatus of claim 5 wherein:
   the means for modulating the shape of the wavefronts surrounds the subject beam path, whereby upon reconstruction noise light is substantially uniformly scattered.

9. The apparatus of claim 5 wherein:
   the means for modulating the shape of the wavefronts comprises a diffusing screen.

References Cited

Gabor: "Character Recognition by Holography," Naturer, vol. 208, No. 5, October 1965, pp. 422, 423.

Leith et al.: "Holographic Imagery Through Diffusing Media," Journal of the Optical Society of America, vol. 56, No. 4, April 1966, p. 523.

Leith et al.: "Wavefront Reconstruction With Diffused Illumination and Three-Dimensional Objects," Journal of the Optical Society of America, vol. 54, No. 11, November 1964, pp. 1295–1301.

Mandel: "Color Imagery by Wavefront Reconstructions," Journal of the Optical Society of America, vol. 55, No. 12, December 1965, pp. 1697–1698.

JOHN K. CORBIN, Primary Examiner

U.S. Cl. X.R.

350—168